US008880827B2

(12) United States Patent
Weich et al.

(10) Patent No.: US 8,880,827 B2
(45) Date of Patent: Nov. 4, 2014

(54) METHOD FOR EXECUTING SECURITY-RELEVANT AND NON-SECURITY-RELEVANT SOFTWARE COMPONENTS ON A HARDWARE PLATFORM

(75) Inventors: Carsten Weich, Vienna (AT); Stefan Poledna, Klosterneuburg (AT); Eric Schmidt, Grosskrut (AT)

(73) Assignee: FTS Computertechnik GmbH, Vienna (AT)

( * ) Notice: Subject to any disclaimer, the term of this patent is extended or adjusted under 35 U.S.C. 154(b) by 259 days.

(21) Appl. No.: 13/501,915

(22) PCT Filed: Oct. 12, 2010

(86) PCT No.: PCT/AT2010/000386
§ 371 (c)(1),
(2), (4) Date: Apr. 13, 2012

(87) PCT Pub. No.: WO2011/044603
PCT Pub. Date: Apr. 21, 2011

(65) Prior Publication Data
US 2012/0210085 A1 Aug. 16, 2012

(30) Foreign Application Priority Data
Oct. 15, 2009 (AT) .................................. A 1627/2009

(51) Int. Cl.
*G06F 12/14* (2006.01)
*G06F 11/30* (2006.01)
*G06F 21/74* (2013.01)
(52) U.S. Cl.
CPC ........ *G06F 21/74* (2013.01); *G06F 2221/2105* (2013.01)
USPC .............................. 711/163; 713/193; 726/27

(58) Field of Classification Search
USPC .............................. 711/163; 713/193; 726/27
See application file for complete search history.

(56) References Cited

U.S. PATENT DOCUMENTS 7,290,284 B1 * 10/2007 Wettergren ..................... 726/27
2011/0138141 A1 * 6/2011 Batifoulier et al. ........... 711/163

FOREIGN PATENT DOCUMENTS

| EP | 1688816 A1 | 9/2006 |
| WO | 0042490 | 7/2000 |
| WO | 2007004219 A2 | 1/2007 |

OTHER PUBLICATIONS

International Search Report, mailed Mar. 2, 2011, completed by EP ISA.

* cited by examiner

*Primary Examiner* — John Lane
(74) *Attorney, Agent, or Firm* — Design IP

(57) ABSTRACT

A method for executing safety-relevant and non-safety-relevant software components on a hardware platform comprising a computer, memory and a monitoring component that operates independently of the computer. The safety-relevant software component erects a memory protection against access of a non-safety-relevant function to at least one area of the memory of the safety-relevant function before execution of the non-safety-relevant software component, so that the non-safety-relevant software component does not have access to the areas of the memory being used for safety-relevant components. After the return from the non-safety-relevant component, the memory protection is deactivated and the monitoring function monitors the safety-relevant function for its proper operation.

11 Claims, 4 Drawing Sheets

```
printf ("example\n");

is executed as:

memcopy (shared_data, parameter);       // The character sequence "example"
                                                // occurs in the common
                                                // data area SW-TRAP;                                // Perform an interrupt // the following code is executed in the interrupt context Reconfigure memory protection;          // Memory of the safety-
                                                // critical function now
                                                // protected printf (&shared_data);                  // Retrieval of the standard function Reconfigure memory protection;          // Memory of the safety-
                                                // critical function is now
                                                // open again check_point();                          // Send alive signals RETURN-IRQ;                                     // Terminate the interrupt
```

Figure 2

| | |
|---|---|
| Reconfigure memory protection; | // Memory is first<br>// blocked |
| ...<br>select_next_task ()<br>... | // Check interrupt source<br>// Find task/ISR that should<br>// be activated |
| if (privileged)<br>{ | // Safety-relevant task? |
|    Reconfigure memory protection; | // Memory now accessible<br>// for the safety-critical function. |
|    ...<br>   activate_task ();<br>... | //Activate safety-relevant<br>// function |
| }<br>... | |

METHOD FOR EXECUTING SECURITY-RELEVANT AND NON-SECURITY-RELEVANT SOFTWARE COMPONENTS ON A HARDWARE PLATFORM

CROSS REFERENCE TO RELATED APPLICATIONS

The present application is a U.S. National Stage Application of PCT application Serial No. PCT/AT2010/000386, filed on 12 Oct. 2010, which claims priority from Austrian Patent Application Serial No. A 1627/2009, filed on 15 Oct. 2009, both of which are incorporated by reference in their entireties.

The invention relates to a method for executing safety-relevant and non-safety-relevant software components on a hardware platform, wherein the hardware platform comprises a computer unit and at least one memory and wherein the at least one non-safety-relevant software component and with the at least one safety-relevant software component are both executed on this one computer unit and wherein the hardware platform comprises a monitoring component or is connected to same and wherein this monitoring component operates independently of the at least one processor of the hardware platform.

In addition, the invention also relates to a hardware platform on which such a method is implemented.

Computer systems are used to an increasing extent for tasks in which faulty or late reactions of the computer system may endanger human life or property ("safety-relevant systems"). Such systems must be developed and tested in accordance with standardized guidelines (IEC61508, ISO26262) to largely rule out errors. The corresponding development of such systems is very complex, tedious and expensive accordingly.

On the other hand, computer-assisted functions are being used in more and more fields. There is often the demand to expand a control with "standard functions" by adding a "safety-relevant function." Example: The ACC function (Adaptive Cruise Control, which regulates the speed of one's own vehicle at the speed of the vehicle driving in front, is a non-critical (comfort) function) and should be expanded to automatic emergency braking (safety-relevant function).

SUMMARY OF THE INVENTION

Safety-relevant and non-critical functions taking place simultaneously in a single control unit has cost advantages (fewer control units, less cabling, simpler maintenance, ... ). However, it is necessary to ensure that errors in the non-critical functions cannot impair the safety-relevant functions. The state of the art offers special operating systems for this purpose (ARINC 653, DECOS), which prevent the non-critical functions from "extending" to safety-relevant functions through various measures. The disadvantage of these operating systems is that they make very specific demands of the control unit hardware as well as the programming of the functions, so that the integration of non-critical functions in such systems is again complex and expensive.

One object of the invention is to offer an inexpensive and nevertheless effective possibility of efficiently expanding the existing control units and existing "standard functions" by adding "safety functions" to thereby save on development costs and item costs.

This object is achieved with the method mentioned in the introduction and/or a hardware platform mentioned in the introduction by the fact that the hardware platform according to the invention has write protection mechanisms for at least a portion of the at least one memory and the safety-relevant software component has full write access to certain areas or to the entire memory or the safety-relevant software component has access to a certain area of the memory, which is separated from an area of the memory provided for non-safety-relevant functions and wherein the safety-relevant software component erects memory protection against access of a non-safety-relevant function to at least one area of the memory of the safety-relevant function, and does so before the execution of the non-safety-relevant software component, so that the non-safety-relevant software component has access via write access only in limited areas of the memory and in particular does not have access to the separate areas of the memory for safety-relevant components, and wherein after returning from the non-safety-relevant component, the memory protection is shut down again, and wherein the monitoring component monitors the safety-relevant function to determine if the safety-relevant function is running properly.

"Return" from the non-safety-relevant component here means that the safety-relevant component "initiates" the non-safety-relevant component, then "only" the non-safety-relevant component runs, and when it has stopped, the safety-relevant component runs again.

The invention offers a less expensive solution here than those described above. At the core of the invention, an "optimistic method" is used. In other words, it is assumed in a positive sense that the non-critical functions do not cause any errors. Whether this assumption is correct is checked reliably and very rapidly. Thus, although the encroachment (=error of a non-critical function, which could affect the safety-relevant function) is not prevented, it is detected, so that the safety-relevant function can be brought into a safe state (or there is a reaction to the interference in another suitable manner).

The safe state normally means "shutdown"—a different type of safe state might be the faulty function is stopped before the execution of the encroachment (e.g., overwriting an area of the working memory needed by the safety-relevant function)—without any negative effect on the safety-relevant function. This could be accomplished through an exception handling routine.

For most systems this procedure is quite adequate because there are usually other unreliable parts and safety-relevant systems should never be allowed to enter an unsafe state even on occurrence of a single fault.

In one variant of the invention in which an operating system is running on the computer unit (=CPU), a dispatcher of this operating system ensures that the memory protection is always in effect before a non-safety-relevant schedule decision is made, and the memory protection of the areas of the memory separated from the non-safety-relevant area is released only when (precisely when) the schedule decision has been made to activate a safety-relevant component.

It is fundamentally advantageous if after retrieval of a non-safety-relevant software component from the safety-relevant function, an alive signal is sent to the monitoring module.

In addition, it may be advantageous if a time stamp is sent to the monitoring module before and after retrieval of a non-critical software component.

It is especially favorable if an alive signal is sent to the monitoring module distributed at several locations ("central" locations) of the safety-relevant software components, which are important for the sequence of the safety-relevant function, so that the monitoring module can also check the functional sequence of the safety-relevant software components.

In this case, instead of using a simple alive signal, the sequence of multiple checkpoints is also monitored via checksums or the like. One is thus able not only to see that the safety-relevant function is running but also in which order certain critical points have been approached in the function.

Finally it is especially advantageous if the monitoring module converts the (sub)system to a safety state after the absence of an alive signal and/or time stamp.

BRIEF DESCRIPTION OF THE DRAWINGS

The invention is explained in greater detail below on the basis of the drawings, in which FIG. 2 shows the pseudo-code of a check/protective function, FIG. 3 shows the sequence of an independent check of the safety-relevant functions and FIG. 4 shows a pseudo-code memory protection activation in the dispatcher of an operating system.

DETAILED DESCRIPTION OF THE PREFERRED EMBODIMENTS

The present invention is based on a combination of several features and methods:

1. Implementation of a memory protection of the memory of the CPU to block misdirected memory accesses from non-critical functions (detect).

Figure 1:
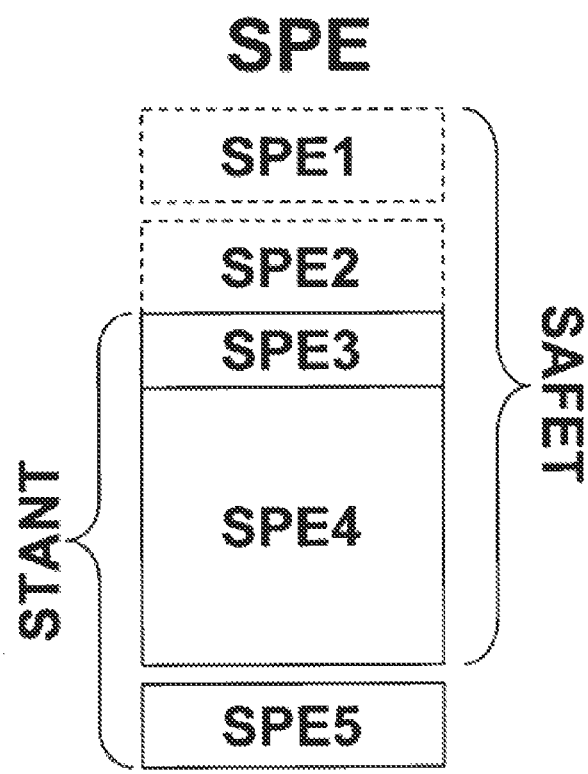
FIG. 1 shows a segmentation of the working memory of the computer unit (CPU) on which a non-critical function and a safety-relevant function are being executed.

2. Use of a check component in an independent unit which functions as a monitoring module to detect a faulty sequence of a safety-relevant function This method utilizes these two techniques to achieve a reliable monitoring of safety-relevant functions. The working memory SPE of the CPU of the control unit is segments in accordance with FIG. 1.

The safety-relevant functions SAFET can read and write to the entire working memory SPE (or essential areas SPE1-SPE4 of the memory SPE) while the non-critical functions STANT can read and write only a portion SPE3-SPE5 of the working memory SPE. A portion SPE3 of the memory SPE, which is assigned to the non-critical area, is defined as the exchange area. If necessary, data can be exchanged here between safety-relevant functions and non-critical functions.

The segmentation of the memory SPE must take place in such a way that the safety-relevant functions had their own stack and heap area SPE1. Direct retrieval of functions between these areas is therefore impossible.

It may be possible for safety-relevant functions to have access to the stack/heap area SPE5 of the standard functions (not shown); as a rule, this is needed more rarely but it is important that it is certain that standard functions cannot access the stack/heap SPE1 of the safety-relevant functions (or the variables either).

Memory segment alone is not sufficient to protect the safety-relevant functions. It is also necessary to ensure that the non-critical functions do not block the CPU due to an error and thereby prevent the safety-relevant functions from being able to react promptly. The method according to the invention does not prevent a blockade but it can detect one. Each time there is a switch between safety-relevant functions and non-critical (standard) functions, a software checkpoint (SW checkpoint) is run through.

The pseudo-code in FIG. 2 (an example of retrieval of a standard function by a safety-relevant function is described here) discloses the core of the method according to the invention, namely the check/protection function, with which working memory accesses as well as runtime performance of the non-critical functions is checked.

The CPU is always initialized by a safety-relevant function, which then has control of the CPU from the beginning Each time a non-critical function should run, the protection of the safety-relevant function(s) is elevated on two sides: (1) the reconfiguration of the memory protection achieves protection of the data of the safety-relevant function. Settings are made on special modules of the CPU, so that only accesses to a restricted area of the working memory are allowed. Parameters that must be exchanged are first copied to an exchange area. If the standard function should also supply return data, a similar mechanism would be performed in the other direction (from non-critical function to safety-relevant function) (not shown in the pseudo-code). (2) The SW checkpoint (called a "check_point" in pseudo-code) ensures that any hanging of the standard function is detected. An alive signal is sent and is monitored outside of the CPU (see below).

The pseudo-code shown in FIG. 2 must be generated for each retrieval of a standard function in the safety-relevant context. Known macro- and/or code-generating techniques may be used for this purpose, so that this code need not be written manually.

Figure 3:
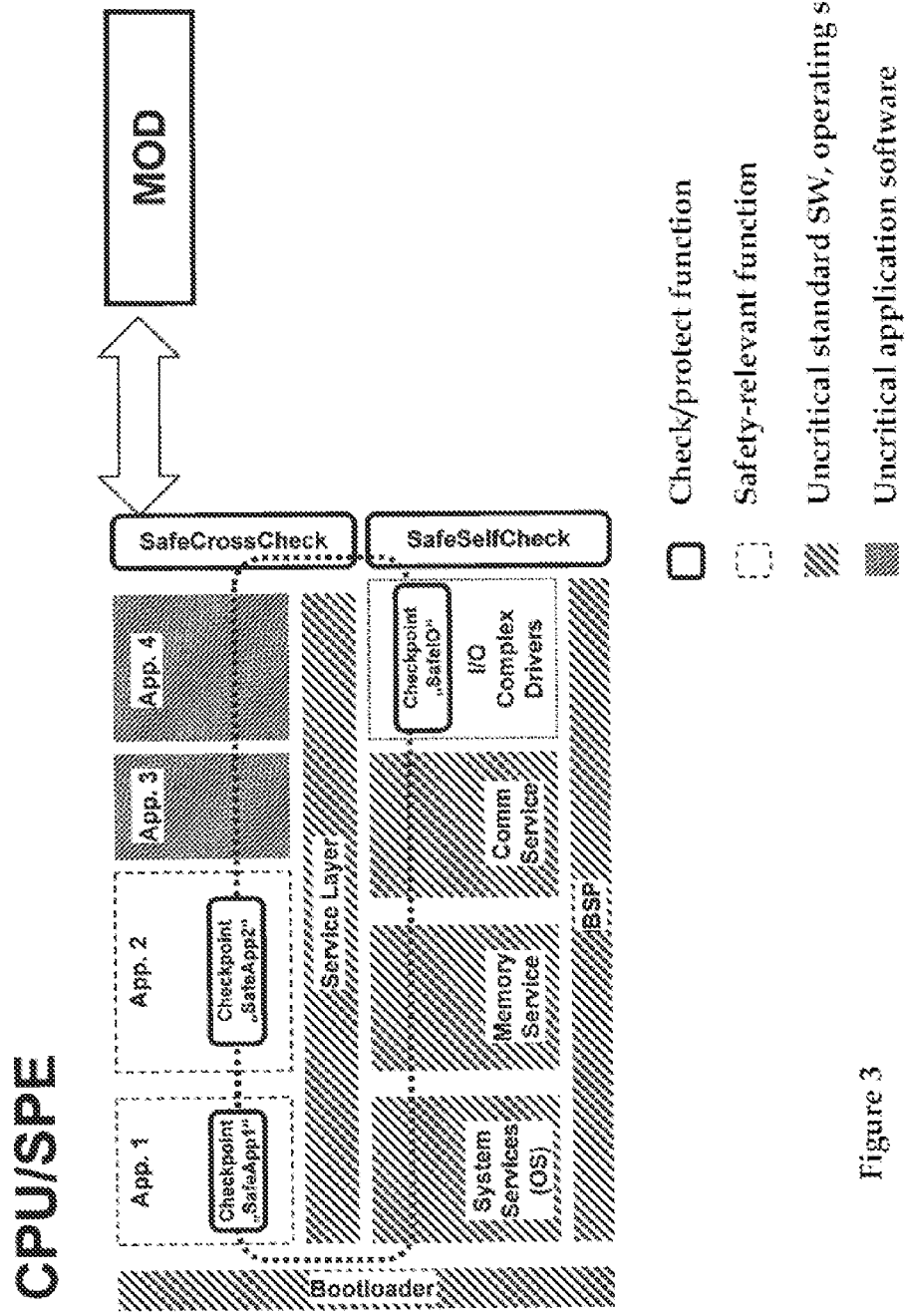

To detect the case when an non-critical function faultily claims the CPU for longer than allowed (i.e., blocking it), the alive signals of the safety-relevant function sending the check/protect function must be monitored independently. To do so, for example, a monitoring module outside of the CPU may be used. FIG. 3 shows such a design. The alive signals are collected (see module SafeCrossCheck in FIG. 3) and transmitted over an I/O line to the monitoring module MOD. The monitoring module MOD "lives independently" of the CPU on which the safety-relevant functions are running, so it is not affected by errors or blockades in the CPU and can detect in this way when a safety-relevant function is no longer running correctly.

If the monitoring function does not receive the alive signal promptly, it may initiate measures to convert the system to a safe state. For example, a subsystem such as a motor or a control unit may be shutdown or a mechanical lock/a mechanical "backup system" is activated (e.g., to achieve a rigid connection between the steering wheel and the wheels).

In summary, the method described here differs from the approaches according to the prior art in that The method is "optimistic." If it does not attempt to force a hard separation of safety-relevant functions and non-critical functions. However, encroachment of the non-critical functions into the safety-relevant area is reliably detected.

It is simple and uses hardly any resources.

A certified operating system is not required. This method can be used in systems without an operating system just as well as in systems with a standard operating system which is then treated like a non-critical function.

Adjustment of the non-critical functions to the method is not necessary. The non-critical software may be integrated with no change. The API ("application programming interface") to the non-critical functions may be retained.

Variants of the Invention (1) Time monitoring of the non-critical functions

The check/protect function may also be used to record the duration of the non-critical functions. To do so, a time stamp is saved before retrieval of the non-critical function. After retrieval the running time of the non-critical function can thus be measured. This running time is transmitted to the monitoring module. Exceeding a certain limit of running time consumption of the non-critical functions is interpreted as an error.

(2) More extensive checking of the safety-relevant functions

The method described here may be expanded so that complex checks of the safety-relevant functions are performed. Thus a certain path can be pursued independently in the safety-relevant function, in that a certain sequence of retrievals is also documented in the check/support function.

(3) Use with an operating system

If safety-relevant functions are to be executed in a system with a standard operating system which does not itself fulfill the required safety standard, then this is also possible with the method according to the invention. The following safety-relevant functions must be integrated into the operating system so that the rules of the method are observed with any change of context:

Activation of the memory protection before initialization of the task which should be executed on the CPU (activation of the memory protection in an early initialization phase of the software)

Correct modification of the memory protection with each task switch

Reliable modification of the memory protection through interrupts.

The pseudo-code in FIG. 4 shows the required expansion of the dispatcher. The dispatcher begins with an interrupt, the code generated in FIG. 4 being contained in the interrupt service routine.

The possibility of monitoring non-critical functions over time as described in variant (1) is also possible for the operating system. The timer must then additionally be included in all the context changes described above.

(4) Various classes of memory segments

For reasons of simplicity, only two memory protection classes are always mentioned in the description of the method:

Memory fully opened for safety-relevant function
Safety-relevant memory areas fully protected.

However this method may also be used in systems having a larger number of memory protection classes. Various safety-relevant functions can be managed but each can access only its own memory area but not the areas of other safety-relevant functions. Within the non-critical functions different memory areas may also be defined. One condition must be met for this method: the private memory area (RAM, ROM, stack, heap) of a safety-relevant function must be protected from the access by a non-critical function.

The method according to the invention makes it possible to have safety-relevant software functions run in a computer together with standard functions and/or operating systems. Safety-relevant and non-critical functions run in a separate context (with their own stack/heap and their own memory segments). Switching between safety-relevant functions and non-critical functions is used to (de)activate not only the memory protection. Alive signals are also deposited at the same location, allowing a monitoring module to observe the control unit independently and shut it down if there are errors.

This method is characterized by the fact that it is simple and has broad possibilities for application. Only hardware-supported memory protection and a monitoring module that runs independently are needed. No requirements are made of the standard software used so it may be used largely unchanged.

When there is a change in context, adaptations must be made only at a few critical locations in the functions close to the operating system.

The method according to the invention is suitable in particular for use on computers in safety-critical areas—either embedded or as a host.

The invention claimed is:

1. A method for executing a safety-relevant software component and a non-safety-relevant software component on a hardware platform, wherein the hardware platform comprises a computer unit (CPU), a memory, and a write protection mechanism for at least a portion of the memory, the hardware platform further comprising or being connected to a monitoring component and the monitoring component operating independently of the computer unit (CPU), wherein the safety-relevant software component has full write access to at least one certain area of the memory or to an entirety of the memory or the safety-relevant software component has access to at least one certain area of the memory which is separated from at least one separate area of the memory that is provided for access by the non-safety-relevant software component, the method comprising:

setting up, using the safety-relevant software component, the write protection mechanism before execution of the non-safety-relevant software component on the computer unit (CPU), against an access of the non-safety-relevant software component to the at least one certain area of the memory for the safety-relevant software component so that the non-safety-relevant software component has write access only in the at least one separate area of the memory that is provided for access by the non-safety relevant software component, and in particular does not have access to the at least one certain area of the memory for the safety-relevant software component;

executing the non-safety-relevant software component together with the safety-relevant software component on the computer unit (CPU);

shutting down the write protection mechanism again after returning from the non-safety-relevant software component; and monitoring the safety-relevant software component for its proper operation using the monitoring component.

2. The method according to claim 1, further comprising running an operating system on the computer unit (CPU), wherein a dispatcher of the operating system ensures that the write protection mechanism is always activated before a non-safety-relevant schedule is made, and the write protection mechanism of the at least one separate area of the memory from the non-safety-relevant area is enabled only when the schedule decision for activation of the safety-relevant software component has been made.

3. The method according to claim 1, further comprising sending an alive signal to the monitoring component by the safety-relevant software component after retrieving a non-safety-relevant software component.

4. The method according to claim 1, further comprising sending, a time stamp to the monitoring component before and after retrieving a non-critical software component.

5. The method according to claim 1, further comprising sending an alive signal to the monitoring component at central locations of the safety-relevant software component so that the monitoring component can also check a functional sequence of the safety-relevant software component.

6. The method according to claim 1, further comprising converting a subsystem of the hardware platform to a safe state after the absence of receipt of an alive signal and/or a time stamp by the monitoring component.

7. A hardware platform for performing a method according to claim 1.

8. The method according to claim 1, further comprising segmenting a portion of the at least one separate area of the memory into an exchange area, wherein the exchange area may be accessed by both the safety-relevant software component and the non-safety-relevant software component such that data can be exchanged in the exchange area between the safety-relevant software component and the non-safety-relevant software component.

9. A computer hardware platform, the computer hardware platform comprising:
- a computer unit (CPU);
- a memory unit having a first portion;
- a safety-relevant software component that is executable on the computer unit (CPU), the safety-relevant software component having write access to at least the first portion of the memory unit;
- a non-safety-relevant software component that is executable on the computer unit (CPU); and
- a monitoring component that operates independently of the computer unit (CPU), the monitoring component being operationally configured to monitor the safety-relevant software component for its proper operation;

wherein, in a first mode in which the non-safety-relevant software component is not being executed on the computer unit (CPU), the safety-relevant software component is executable on the computer unit (CPU) in order to temporarily establish a write protection mechanism for at least the first portion of the memory unit such that the first portion of the memory is accessible to the safety-relevant software component but inaccessible to the non-safety-relevant software component; and wherein, in a second mode which occurs after the non-safety-relevant software component has been executed together with the safety-relevant software component on the computer unit (CPU), the write protection mechanism may be shut down.

10. The computer hardware platform of claim 9, wherein the safety-relevant software component has write access to the entire memory unit.

11. The computer hardware platform of claim 9, wherein the memory unit further comprises an exchange area, wherein the exchange area is accessible by both the safety-relevant software component and the non-safety-relevant software component such that data can be exchanged in the exchange area between the safety-relevant software component and the non-safety-relevant software component.

* * * * *